April 8, 1924.
J. NAPOLIS ET AL
HAND SPRAYER
Filed Dec. 18, 1919
1,489,452
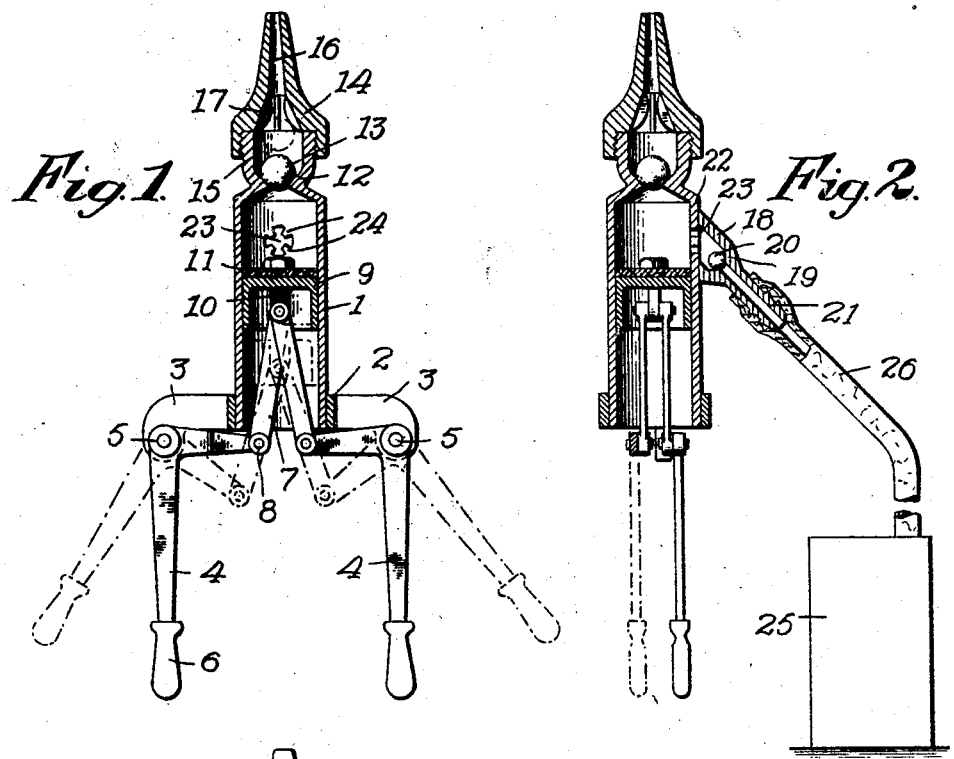
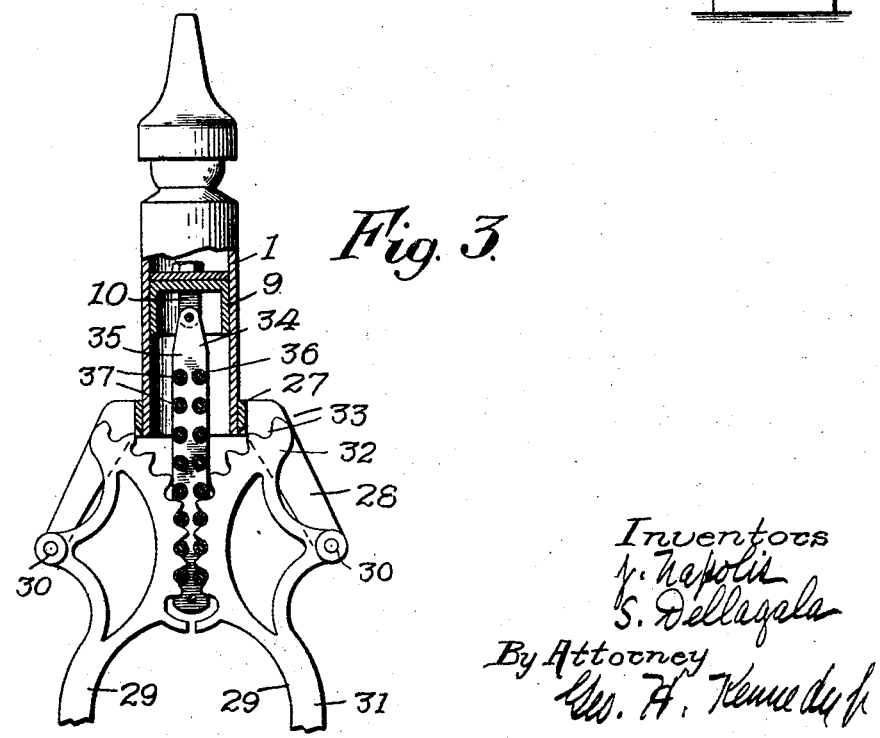
Inventors
J. Napolis
S. Dellagala
By Attorney
Geo. H. Kennedy Jr.

Patented Apr. 8, 1924.

1,489,452

UNITED STATES PATENT OFFICE.

JAMES NAPOLIS AND SAMUEL DELLAGALA, OF WORCESTER, MASSACHUSETTS.

HAND SPRAYER.

Application filed December 18, 1919. Serial No. 345,851.

*To all whom it may concern:*

Be it known that we, JAMES NAPOLIS, a citizen of the United States, and SAMUEL DELLAGALA, a subject of the King of Italy, both residing at Worcester, in the county of Worcester and Commonwealth of Massachusetts, have invented a new and useful Improvement in Hand Sprayers, of which the following, together with the accompanying drawings, is a specification.

Our invention relates to sprayers for liquids, and it has for its object to provide a hand sprayer that is particularly adapted for use in agricultural pursuits, or for any other purpose which requires the distribution of liquid in the form of a spray.

The essential requirements of a hand sprayer are lightness and simplicity combined with the ability for the sprayer to throw the liquid a considerable distance, as for example, when spraying trees or vines. By our invention we propose to provide a sprayer that can be readily handled by a single operator and is capable of throwing a stream of liquid a considerable distance, with the expenditure of a minimum amount of effort on the part of the operator.

In the accompanying drawings,

Figure 1 is a view partially in section and partially in front elevation of a sprayer embodying our invention.

Figure 2 is a transverse sectional view of the parts shown in Fig. 1.

Figure 3 is a view partially in section and partially in front elevation showing a modification of the sprayer shown in Fig. 1.

Similar reference characters refer to similar parts in the different figures.

Referring to Figs. 1 and 2, the sprayer consists of a cylinder 1 which is supported at one end in a bracket 2. The bracket 2 is provided with laterally extending arms 3, upon which the operating handles 4 of the sprayer are pivotally mounted upon pivot pins 5. The handles 4 are preferably in the form of bell cranks, the longer arm of each handle being provided with a portion 6 which may be readily grasped by the hand, and the shorter arm being pivotally connected at its end to an operating link 7, as shown at 8.

A piston 9 is adapted to slide within the cylinder 1 and is provided with a lug 10 to which are pivotally connected the links 7, whereby the piston may be moved within the cylinder by pivotal movement of the operating handles 4. The piston 9 is provided with a suitable packing 11.

The cylinder 1 is constricted at its upper end to provide a seat 12 for a ball valve 13. A nozzle 14 is secured to the constricted portion 15 of the cylinder, beyond the valve seat 12, and is provided with a discharge passage 16. The passage 16 is flared out above the valve seat 12 and is provided with a plurality of spaced radial projections 17 to limit the upward movement of the ball valve 13 and at the same time to allow free passage of the liquid around the ball valve 13 into the discharge passage 16, as shown in dotted lines.

The cylinder 1 is also provided with a laterally extending projection 18 within which is formed a valve seat 19 for a ball valve 20 and an inlet passage 21. The side wall 22 of the cylinder 1 is provided with an inlet opening 23 which is best shown in Fig. 1, and is provided with a plurality of inwardly extending projections 24 to prevent the passage of the ball valve 20 therethrough, and at the same time to permit the free passage of fluid around the ball valve 20. The inlet passage 21 is connected to a suitable source of fluid supply, such as a tank 25 by means of a hose 26 secured to the end of the projection 18.

Referring now to Fig. 3, the sprayer shown therein comprises a cylinder 1 of the same construction, and is provided with the same valve arrangement as the cylinder shown in Fig. 1. The ring 27 which supports the cylinder 1 is provided with a pair of arms 28 which extend outwardly a considerable distance beyond the end of the cylinder 1. Operating handles 29 are pivotally mounted at the ends of the arms 28, as shown at 30, and respectively comprise a lever portion 31 and a curved sector 32 having a plurality of teeth 33.

A rack 34 is pivotally connected at one end to the lug 10 of the piston 9 and comprises a pair of plates 35 between which a plurality of rollers 36 are rotatably mounted upon pins 37. The rollers 36 are arranged in two series in parallel relation, each series of rollers being adapted to be engaged by the teeth 33 of the sector 32. The center of curvature of each sector 32 is approximately at the pivotal points 30, so that as the sectors are moved by the handles 29 the rack 34 will move in a straight line that is substantially parallel to the central longitudinal axis of the cylinder 1.

From the foregoing description it is apparent that either form of sprayer may be held at arm's length by the operator and caused to throw liquid from the supply tank 25 by moving the handles back and forth about their pivotal points. The fact that the operating handles are pivotally mounted at points beyond the end of the cylinders allows a considerable leverage to be exerted upon the pistons either through the shorter arms of the bell crank levers or the pivotally mounted sectors.

In this way the pistons are adapted to be driven the full length of their stroke by a convenient movement of the arms, and with the expenditure of a minimum amount of effort on the part of the operator. The distance which the liquid is thrown can be easily regulated by varying the force applied to the operating handles and the quickness of the movement. It is obvious that our sprayer is extremely portable and can be used for a great variety of purposes, among which may be mentioned the spraying of trees and vines, or the coating of walls with white wash or paint.

While we have shown our invention in its simplest and preferred forms, it is not so limited but is susceptible of various other modifications within the scope of the appended claims.

We claim,

1. A hand sprayer comprising a cylinder open at one end and provided at the other end with valve chambers containing inlet and outlet valves, a piston movable within said cylinder, and a pair of bell crank handles pivotally mounted on pins spaced from the open end of said cylinder, and each connected to said piston by a link extending into the open end of said cylinder.

2. A hand sprayer comprising a cylinder open at one end and having its other end constricted to provide a seat for a ball valve, and a further constricted nozzle surrounding said valve seat to prevent the escape of said valve, a piston movable in said cylinder, arms extending oppositely from the open end of said cylinder, and a pair of bell crank operating handles pivotally mounted at the ends of said arms and each connected to the end of said piston by a link extending into the open end of said cylinder.

JAMES NAPOLIS.
SAMUEL DELLAGALA.